(12) United States Patent
Sasaki

(10) Patent No.: US 10,144,546 B2
(45) Date of Patent: Dec. 4, 2018

(54) LABEL FEEDING MACHINE

(71) Applicant: SATO HOLDINGS KABUSHIKI KAISHA, Tokyo (JP)

(72) Inventor: Shuzo Sasaki, Iwate (JP)

(73) Assignee: SATO HOLDINGS KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 15/308,441

(22) PCT Filed: May 18, 2015

(86) PCT No.: PCT/JP2015/064190
§ 371 (c)(1),
(2) Date: Nov. 2, 2016

(87) PCT Pub. No.: WO2015/182420
PCT Pub. Date: Dec. 3, 2015

(65) Prior Publication Data
US 2017/0066548 A1 Mar. 9, 2017

(30) Foreign Application Priority Data
May 26, 2014 (JP) ................................ 2014-107670

(51) Int. Cl.
B65C 9/08 (2006.01)
B65C 9/40 (2006.01)
G01V 8/12 (2006.01)
B65C 9/42 (2006.01)

(52) U.S. Cl.
CPC .................. B65C 9/08 (2013.01); B65C 9/40 (2013.01); B65C 9/42 (2013.01); G01V 8/12 (2013.01)

(58) Field of Classification Search
CPC .... B65C 9/08; B65C 9/18; B65C 9/40; B65C 9/42; B65C 9/46; B65C 2009/402; B65C 2009/404; B65C 2210/0094; G01V 8/12; B65H 7/14
USPC ........................................................ 156/367
See application file for complete search history.

(56) References Cited

U.S. PATENT DOCUMENTS 6,127,678 A * 10/2000 Christensen ........... B41J 11/008
200/61.71
2006/0180737 A1* 8/2006 Consiglio .................. B65C 9/42
250/200

FOREIGN PATENT DOCUMENTS

| JP | 64-14763 U | 1/1989 |
| JP | 6-510973 A | 12/1994 |
| JP | 11-199097 A | 7/1999 |
| JP | 11-199098 A | 7/1999 |
| JP | 2002-179306 A | 6/2002 |

(Continued)

OTHER PUBLICATIONS

Written Opinion in PCT/JP2015/064190 (now WO 2015/182420), dated Aug. 4, 2015.*
European Search Report, dated Jan. 5, 2018, 8 pages.

Primary Examiner — George R Koch
(74) Attorney, Agent, or Firm — Foley & Lardner LLP

(57) ABSTRACT

A label position detector has a sensor, a support member configured to support a strip-shaped liner sheet of a continuous label body, and an opening/closing member provided openably or closably against the support member. The opening/closing member has a main body installed with the sensor and a cover provided with a slot that causes the sensor to face the conveyance passage for the continuous label body and detachably installed on the main body.

18 Claims, 8 Drawing Sheets

(56) References Cited

FOREIGN PATENT DOCUMENTS

| WO | WO 93/07064 A1 | 4/1993 |
| WO | WO-2013/096439 A1 | 6/2013 |

\* cited by examiner

LABEL FEEDING MACHINE

This application is a 371 of PCT/JP2015/064190, filing date May 18, 2015.

TECHNICAL FIELD

The present invention relates to a label feeding machine configured to feed labels by conveying a continuous label body along a label continuous direction, the continuous label body being obtained by temporarily attaching the labels onto a strip-shaped liner sheet at equal intervals, an adhesive agent being applied on each of the labels. More particularly, the present invention relates to a label feeding machine provided with a label position detector having a sensor capable of optically detecting a position of the label in the course of conveying the continuous label body.

BACKGROUND ART

A label feeding machine Ka discussed in JP 11-199097 A is illustrated in FIGS. 6 and 7. The label feeding machine Ka feeds labels by conveying a continuous label body LA onto a strip-shaped liner sheet D at equal intervals along a label link direction. The continuous label body LA obtained by temporarily attaching the labels L. And an adhesive agent is applied on each of the labels. In the label feeding machine Ka illustrated in FIGS. 7 and 8, a label roll 100 obtained by internally winding labels L of the continuous label body LA is installed in a feeding reel 101, and the continuous label body LA is extracted and conveyed from the feeding reel 101 using a conveyance roller 102, so that printing is performed on the labels L using a print unit 103.

The print unit 103 has a thermal head 104 and a platen roller 105 and performs printing through thermal transfer using an ink ribbon 107 supplied from a ribbon feeding mechanism 106. A guide roller 108 is disposed between the feeding reel 101 and the conveyance roller 102.

In the label feeding machine Ka illustrated in FIGS. 7 and 8, the print unit 103 has a label position detector 110 provided with a sensor capable of optically detecting a position of the label L in the course of conveying the continuous label body LA in order to allow printing to be performed on a predetermined position of the label L. As the sensor, a transparent sensor 113 and a reflective sensor 114 are employed. The transparent sensor 113 has a light-emitting portion 111 and a light-receiving portion 112, so that a gap G (FIG. 6) between the labels L is detected by emitting light from the light-emitting portion 111 onto the continuous label body LA and receiving the light by the light-receiving portion 112. The reflective sensor 114 is a sensor capable of detecting marks provided on a rear surface of the liner sheet D at predetermined intervals.

The label position detector 110 has a support member 115 configured to support a strip-shaped liner sheet D of the conveyed continuous label body LA and an opening/closing member 116 provided openably or closably against the support member 115 using a hinge. The support member 115 is formed in a hollowed shape where the light-emitting portion 111 of the transparent sensor 113 and the reflective sensor 114 are installed. A support surface of the support member 115 is provided with through-holes 117 and 118 that expose the light-emitting portion 111 and the reflective sensor 114 to a conveyance passage for the continuous label body LA.

Meanwhile, the opening/closing member 116 is also formed in a hollowed shape and is internally installed with the light-receiving portion 112 of the transparent sensor 113. In a closed state, the opening/closing member 116 faces the light-receiving portion 112 to the conveyance passage for the continuous label body LA through the through-hole 119. In an opened state, the opening/closing member 116 opens the conveyance passage for the continuous label body LA.

As illustrated in FIG. 7, the conveyance roller 102 is provided on the upstream side of the support member 115. While the opening/closing member 116 is closed, the pressing roller 120 is pressed to the conveyance roller 102. The pressing roller 120 is installed in the support member 121 opened or closed similarly to the opening/closing member 116. The opening/closing member 116 is opened or closed in synchronization with the support member 121.

In the label feeding machine Ka of the prior art, a gap is formed between the support member 115 and the opening/closing member 116 to allow the continuous label body LA to pass therethrough. However, if the gap is reduced in order to improve detection accuracy of the sensor, a jam may occur because the label L of the continuous label body LA is curled up from the liner sheet D and is attached to the opening/closing member 116. In particular, since the continuous label body LA is obtained by unwinding a roll internally attached with the labels L, the label L may be easily stripped from the liner sheet D.

In the event of such a jam, the jammed label L may be stripped and removed by opening the opening/closing member 116. Then, the setting may be performed again by installing the continuous label body LA in the support member 115 again and closing the opening/closing member 116.

SUMMARY OF INVENTION

However, in the label feeding machine Ka of the prior art, although the jammed label L curled up in the gap between the support member 115 and the opening/closing member 116 and attached to the opening/closing member 116 is stripped and removed by opening the opening/closing member 116, the jammed label L may not be easily removed if it is attached to the vicinity of the hinge and propagates to a deeper side of the machine. This degrades workability in removal.

In view of the aforementioned problems, it is therefore an object of the present invention to provide a label feeding machine capable of facilitating removal of a jammed label and improving workability in removal.

According to an aspect of the present invention, there is provided a label feeding machine configured to feed labels by conveying a continuous label body along a label continuous direction, the continuous label body being obtained by temporarily attaching the labels onto a strip-shaped liner sheet at equal intervals, an adhesive agent being applied on each of the labels.

The label feeding machine may have a label position detector. The label position detector may have a sensor configured to optically detect a position of each of the labels in the course of conveying the continuous label body, a support member configure to support the strip-shaped liner sheet for the conveyed continuous label body, and an opening/closing member installed with the sensor and provided openably or closably against the support member such that the sensor faces a conveyance passage for the continuous label body in a closed state, and the conveyance passage for the continuous label body is opened in an opened state.

The opening/closing member may have a main body to which the sensor is installed, and a cover detachably installed on the main body to form a housing space for housing the sensor in combination with the main body and provided with a surface that forms a gap in combination with a support surface of the support member to allow passing of the continuous label body during the closed state of the opening/closing member and a slot that causes the sensor to face the conveyance passage for the continuous label body.

When the continuous label body is set on the machine, the continuous label body is installed on the support member by opening the opening/closing member. Then, the opening/closing member is closed, and the labels are fed by conveying the continuous label body. In the course of conveyance, a jam may occur when the label is curled up from the liner sheet between the support member and the opening/closing member and is attached to the opening/closing member. In this case, the jammed label is removed by opening the opening/closing member.

The jammed label may not be easily removed if it propagates to a deeper side of the machine. In this case, the label attached to the cover can be stripped and removed outside the machine by detaching the cover from the main body. Therefore, it is possible to easily remove the attached label and improve workability in removal.

After the label is removed, the cover is installed in the main body again, the continuous label body is supported in the support member, and the opening/closing member is closed.

In the label feeding machine described above, the surface of the cover may be formed of a material resistant to sticking of an adhesive agent of the label or capable of preventing sticking. For example, preferably, the surface may be subjected to fluororesin coating or plasma coating or may be embossed through texturing or the like.

As a result, even when the label tends to be curled up from the liner sheet between the support member and the opening/closing member and attach to the opening/closing member in the course of conveying the continuous label body, the label is not easily attached to the opening/closing member. Even if a label is curled up and generates a jam, the jammed label can be easily removed by opening the opening/closing member. Therefore, it is possible to improve workability in removal.

If it is difficult to remove the jammed label nevertheless, the label attached to the cover is stripped and removed outside the machine by detaching the cover from the main body as described above. Even in this case, it is possible to facilitate removal of the attached label and improve workability in removal.

The label feeding machine described above may further include: a latching protrusion provided on one side edge of the cover; a latching recess provided on the main body and detachably engageable with the latching protrusion; a nut plate provided on the other side edge of the cover to face a part of the main body while the latching protrusion is engaged with the latching recess; and a fixing portion configured to releasably fix the nut plate to the main body.

As a result, when the cover is installed, the latching protrusion of the cover is inserted and engaged with the latching recess of the main body, and the nut plate is fixed to the main body using the fixing portion. Meanwhile, when the cover is detached, the fixing portion is unfastened, and the latching protrusion of the cover is disengaged from the latching recess of the main body. It is possible to simplify installation and detachment of the cover and improve workability.

In the label feeding machine described above, the fixing portion may have a female thread formed in the nut plate and a bolt provided with a male thread portion inserted into the installation hole of the main body to match the female thread and screwed to the female thread and a head linked to the male thread portion and configured to manually rotate the male thread.

As a result, it is possible to install or detach the cover through simple and easy manipulation by manually rotating the bolt and thus improve workability.

In the label feeding machine described above, the sensor may be a transparent sensor provided with a light-emitting portion and a light-receiving portion to transmit light from the light-emitting portion and detect a gap between labels using the light-receiving portion. In addition, the support member may be formed in a hollowed shape such that any one of the light-emitting portion and the light-receiving portion is provided inside the support member, a slot that exposes the one of the light-emitting portion and the light-receiving portion to the conveyance passage for the continuous label body may be formed on the support surface of the support member, and the other one of the light-emitting portion and the light-receiving portion may be provided on the opening/closing member.

The label feeding machine described above may further include a positioning mechanism configured to position the light-receiving portion along a width direction of the continuous label body, wherein the slot of the cover of the opening/closing member is formed in a long hole shape across a movable range of the light-receiving portion moved by the positioning mechanism. As a result, it is possible to position the light-receiving portion in an optimal place depending on a dimension of the label such as width.

The label feeding machine described above may further include: a conveyance roller provided on the support member side to support and convey the continuous label body; and a pressing roller provided on the main body of the opening/closing member to be pressed to the conveyance roller while the opening/closing member is closed, wherein the cover has an opening where the pressing roller protrudes.

As a result, the pressing roller can also be opened or closed using the opening/closing member at the same time. Therefore, it is possible to improve manipulation convenience compared to a case where they are individually opened or closed.

In this case, even when a jam occurs due to a label curled up from the liner sheet between the support member and the opening/closing member and attached to the opening/closing member in the course of conveying the continuous label body, it is possible to remove the jammed label by opening the opening/closing member.

The jammed label may not be easily removed as it propagates to a deeper side of the machine. In this case, the label attached to the cover may be stripped and removed outside the machine by detaching the cover from the main body. Therefore, it is possible to facilitate removal of the attached label and improve workability in removal.

DESCRIPTION OF EMBODIMENTS

A label feeding machine according to an embodiment of the invention will now be described with reference to the accompanying drawings.

Figure 1:
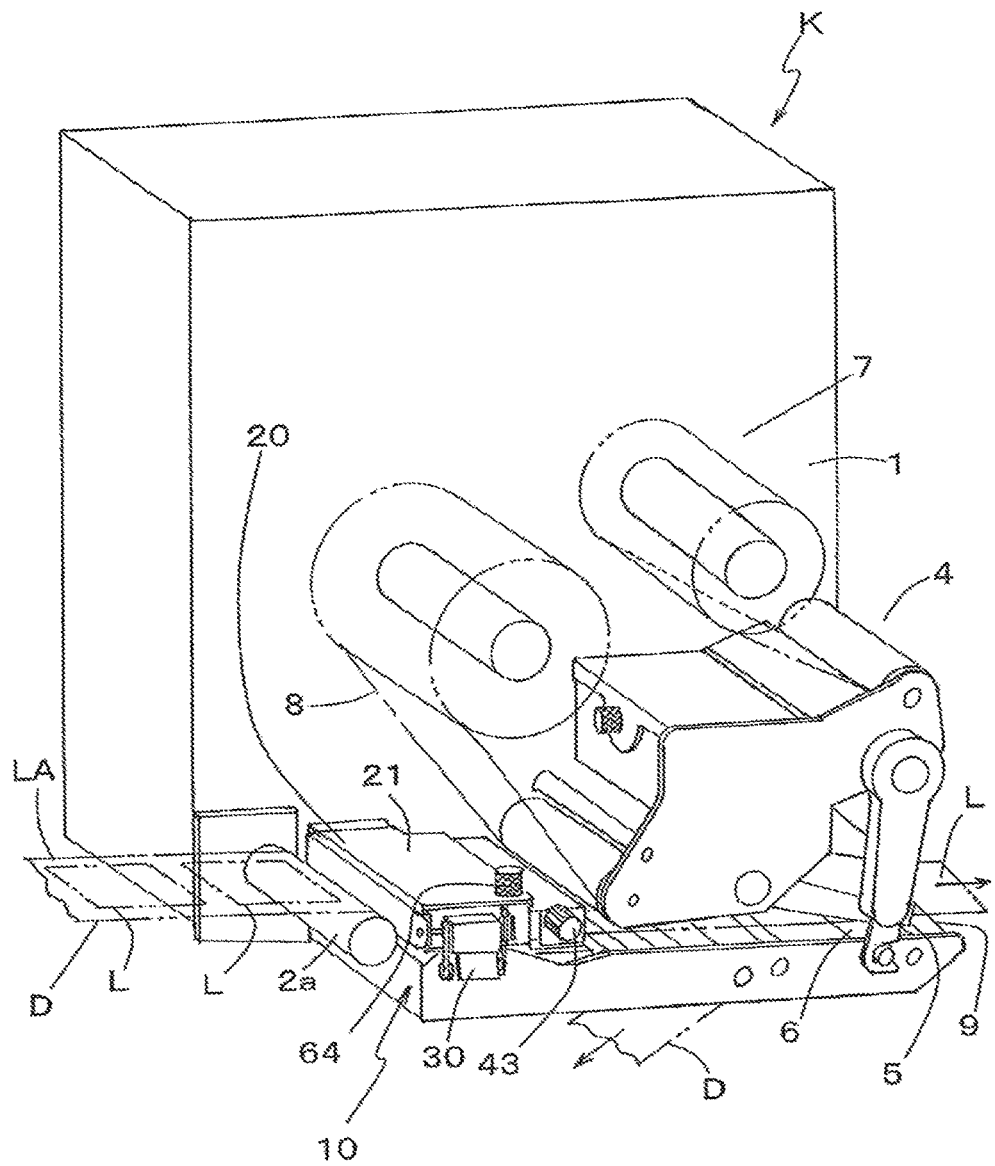
FIG. 1 is a perspective view illustrating a label feeding machine according to an embodiment of the invention.
Figure 6:
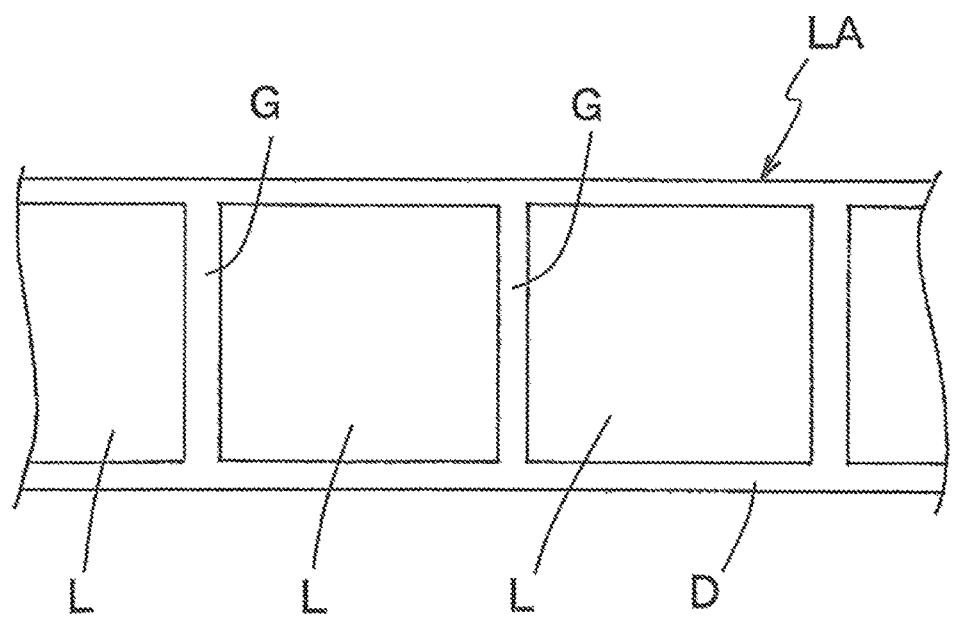
FIG. 6 is a plan view illustrating an exemplary continuous label body employed in the label feeding machine according to an embodiment of the invention.

As illustrated in FIG. 1, the label feeding machine K feeds labels L by conveying a continuous label body LA (refer to FIG. 6) along a label continuous direction, the continuous label body being obtained by temporarily attaching the labels onto a strip-shaped liner sheet D at equal intervals, an adhesive agent being applied on each of the labels.

Figure 7:
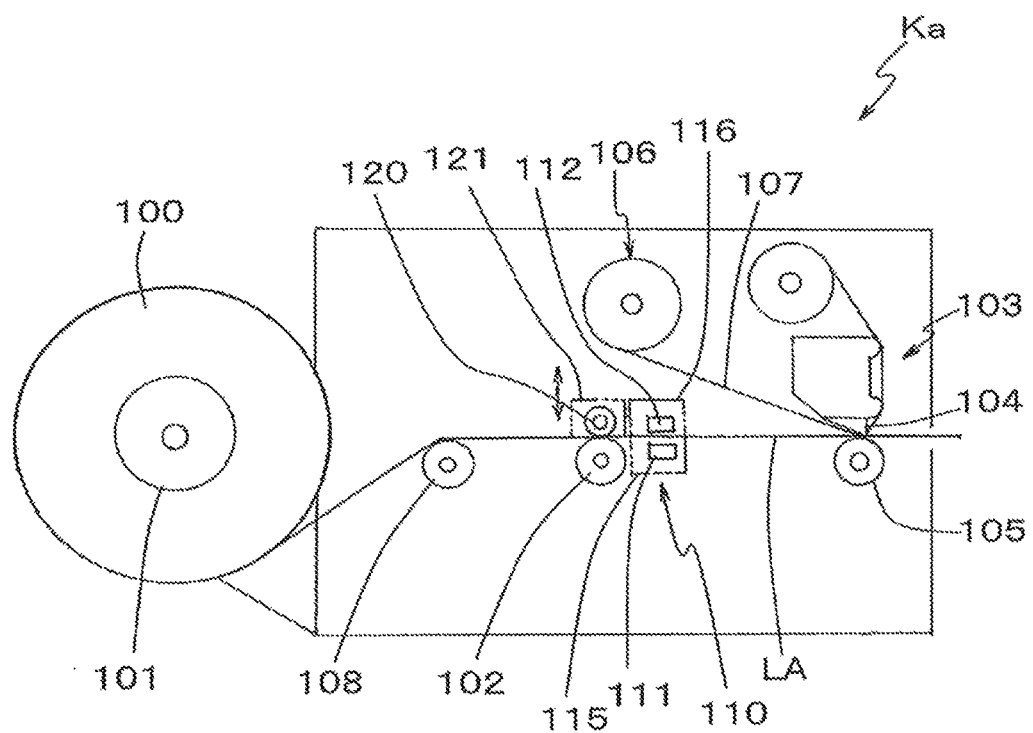
FIG. 7 is a diagram illustrating an exemplary label feeding machine of the prior art.
Figure 8:
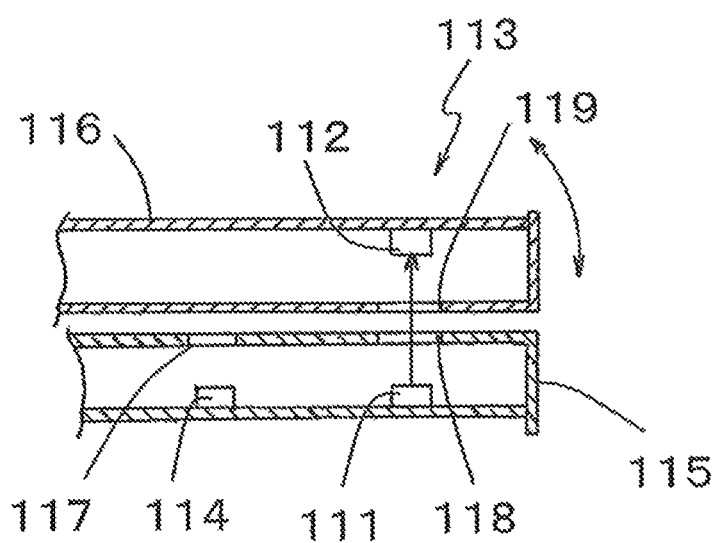
FIG. 8 is a partial cross-sectional front view illustrating a label position detector of the label feeding machine of the prior art.

Similar to the prior art of FIG. 7, the label feeding machine K feeds the labels L by extracting and conveying the continuous label body LA from a label roll (not shown) around which the continuous label body LA is wound using a conveyance roller 2 provided on a machine housing 1 to perform printing in a print unit 4 as illustrated in FIGS. 1 to 5. A pressing roller 3 is pressed to the conveyance roller 2, and the conveyance roller 2 is rotated and driven by a driving unit (not shown), so that the pressing roller 3 and the conveyance roller 2 are operated in combination to convey the continuous label body LA.

The print unit 4 has a thermal head 5 and a platen roller 6 and performs printing on the label L using an ink ribbon 8 fed from a ribbon feeding mechanism 7.

A stripping plate 9 is provided on the downstream side of the platen roller 6 to allow the strip-shaped liner sheet D to turn around and feed the label L by stripping it from the strip-shaped liner sheet D. The turned strip-shaped liner sheet D is discharged to a bottom side of the label feeding machine K. A guide roller 2a is provided on the upstream side of the conveyance roller 2.

As illustrated in FIGS. 1 to 5, the label feeding machine K has a label position detector 10 provided with a sensor for optically detecting a position of the label L in the course of conveying the continuous label body LA in order to allow the print unit 4 to perform printing on a predetermined position of the label L.

A transparent sensor S is employed as the sensor. The transparent sensor S has a light-emitting portion Sa and a light-receiving portion Sb and transmits light from the light-emitting portion Sa onto the continuous label body LA and receives light using the light-receiving portion Sb in order to detect a gap G between the labels L.

The label position detector 10 has a support member 11 provided on the downstream side of the conveyance roller 2 to support the strip-shaped liner sheet D of the conveyed continuous label body LA and an opening/closing member 20 provided openably or closably against the support member 11 using a hinge. The support member 11 is formed in a hollowed shape and is internally installed with the light-emitting portion Sa of the transparent sensor S. A through-hole 13 is formed on a support surface 12 of the support member 11 to face the light-emitting portion Sa. Guide rollers 14 and 15 are provided on the downstream side of the support member 11.

The light-receiving portion Sb of the transparent sensor S is provided on the opening/closing member 20. In a closed state, the opening/closing member 20 causes the light-receiving portion Sb to face a conveyance passage for the continuous label body LA. That is, the opening/closing member 20 allows the light-receiving portion Sb to face the continuous label body LA, while the conveyance passage for the continuous label body LA is opened in the opened state.

Specifically, the opening/closing member 20 has a main body 21 installed with the light-receiving portion Sb and a cover 50. The cover 50 forms a housing space 22 for housing the light-receiving portion Sb in combination with the main body 21 and has a surface 51 that forms a gap "e," where the continuous label body LA can pass, in combination with the support surface 12 of the support member 11 while the opening/closing member 20 is closed.

Figure 3:
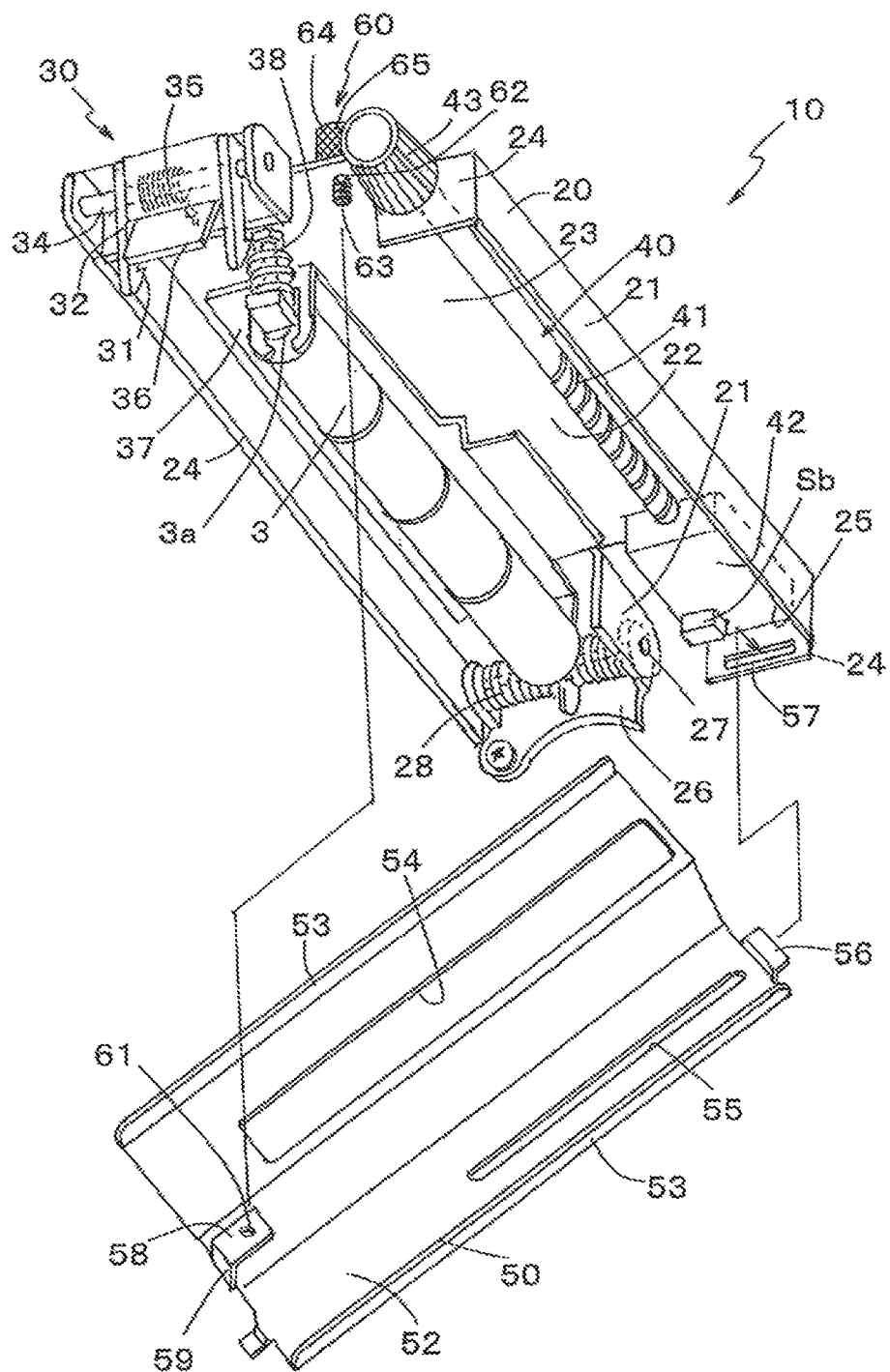
FIG. 3 is an exploded perspective view illustrating the label position detector of the label feeding machine according to an embodiment of the invention while a cover is detached from a main body of the opening/closing member.

The main body 21 has a base plate 23, a side wall plate 24 that extends downward from the edges of the base plate 23 and is partially notched, and a cavity 25 opened to the downside. As illustrated in FIG. 3, one end of the width direction of the main body 21 is pivotally supported around a pivot shaft 27 against an installation member 26 provided on the machine housing 1. The pivot shaft 27 is provided with a coil spring 28 that biases the main body 21 to an opening direction at all times.

Figure 2:
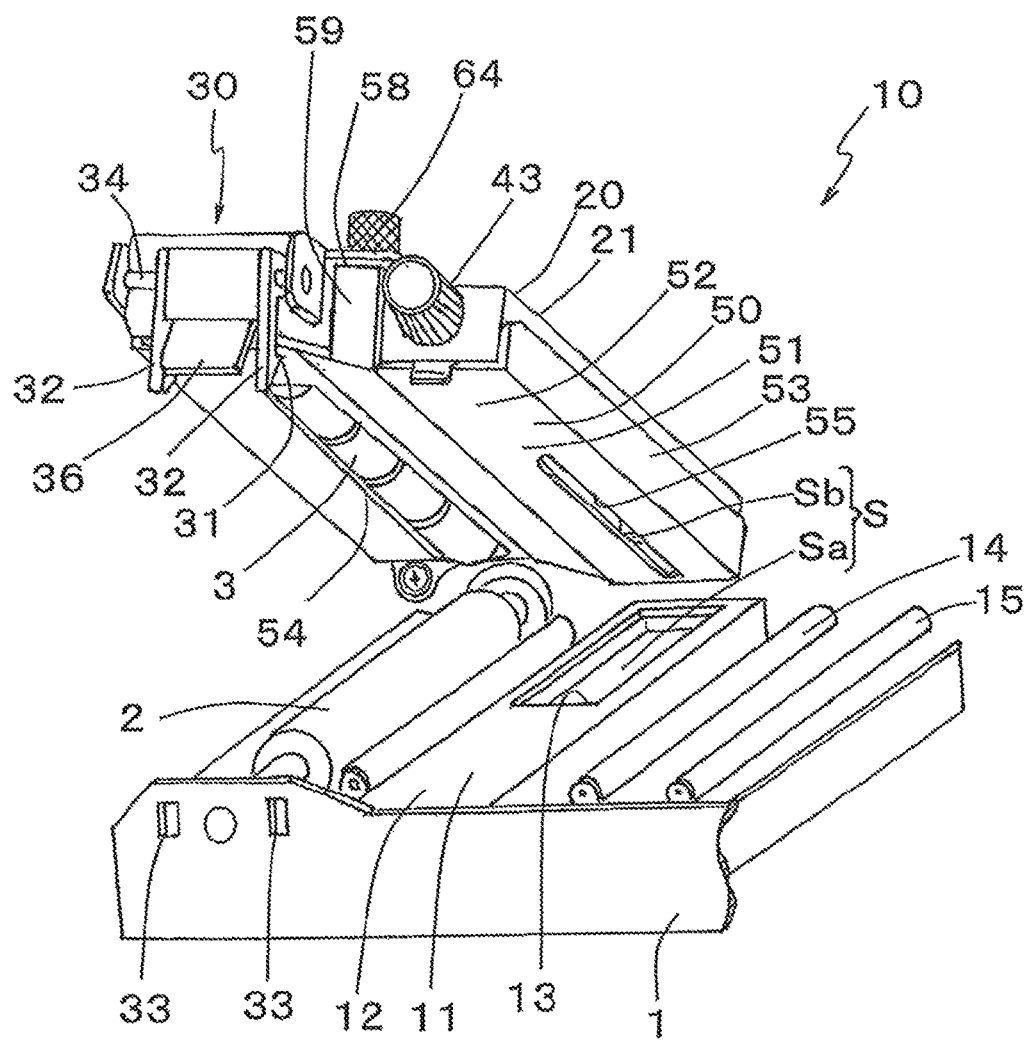
FIG. 2 is a perspective view illustrating a label position detector of the label feeding machine according to an embodiment of the invention while an opening/closing member is opened.

A lock mechanism 30 is a mechanism configured to lock the main body 21 to the machine housing 1 while the opening/closing member 20 is closed. As illustrated in FIGS. 2 and 3, the lock mechanism 30 has a pair of engagement pieces 32 provided on the other end of the width direction of the main body 21 and provided with engagement claws 31 in their tips and a pair of engagement holes 33 provided on the machine housing 1 and engaged with the engagement pieces 32 for locking. The other ends of the engagement pieces 32 are provided pivotally around the pivot shaft 34 against the main body 21 and are engaged with the engagement holes 33 by virtue of pivoting of the pivot shaft 34. The pivot shaft 34 is provided with a coil spring 35 configured to bias the engagement pieces 32 to be engaged with the engagement holes 33 against the main body 21 at all times. The pivot shaft 34 is provided with a manipulation knob 36 configured to pivot the pivot shaft 34 to disengage the engagement pieces 32 from the engagement holes 33 resisting to the biasing force of the coil spring 35.

Figure 4:
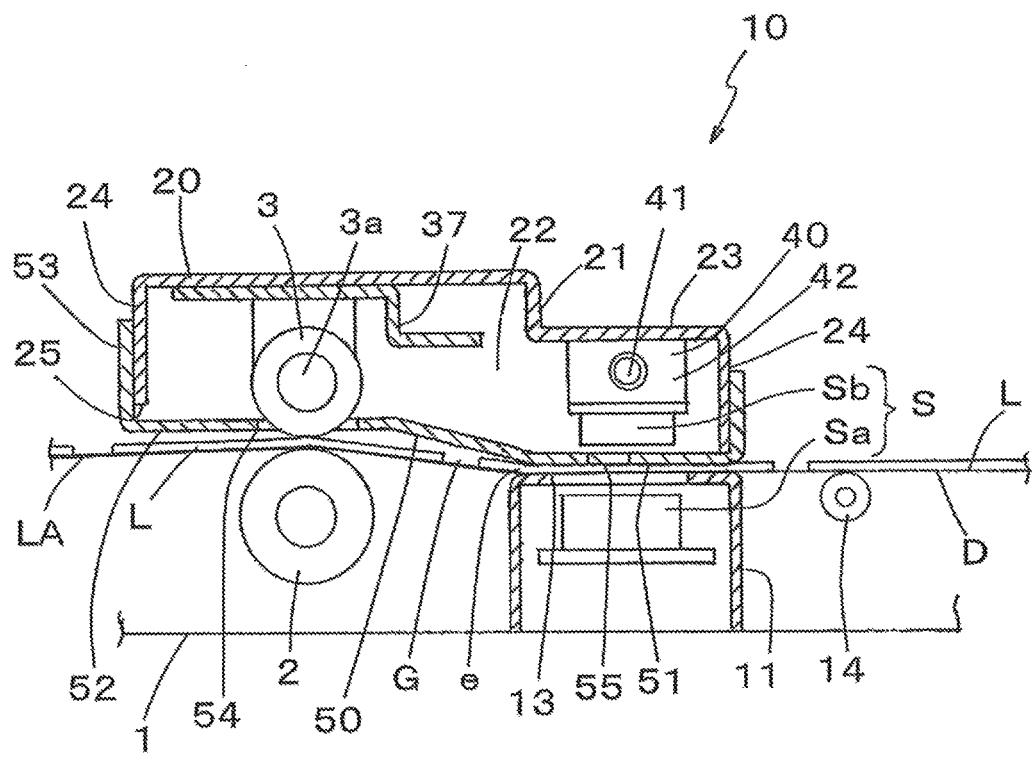
FIG. 4 is a cross-sectional side view illustrating the label position detector of the label feeding machine according to an embodiment of the invention.

A pressing roller 3 pressed toward the conveyance roller 2 during the closed state of the opening/closing member 20 is provided on the bottom side of the base plate 23 of the main body 21 in the upstream side. As illustrated in FIGS. 3 and 4, a plurality of pressing rollers 3 are provided rotatably around a main shaft 3a. Both ends of the main shaft 3a are installed in the main body 21 using a guide member 37 to approach or recede from the conveyance roller 2. A spring 38 configured to bias the pressing roller 3 to make contact with the conveyance roller 2 is provided between the main body 21 and the main shaft 3a.

The light-receiving portion Sb and a positioning mechanism 40 for positioning the light-receiving portion Sb along the width direction of the continuous label body LA are provided on the lower side of the base plate 23 of the main body 21 in the downstream side. The positioning mechanism 40 has a threaded shaft 41 expanding across the side wall plates 24 provided on both sides of the main body 21 in the width direction, a movable block 42 installed with the light-receiving portion Sb and screwed to the threaded shaft 41 to move in synchronization with rotation of the threaded shaft 41, and a control knob 43 used to rotate the threaded shaft 41.

The cover 50 has a cover plate 52 that covers the cavity 25 of the main body 21 and a side plate 53 provided to protrude in the front-rear direction of the cover plate 52 and mated with an outer side of the side wall plate 24 in the front-rear direction of the main body 21. An opening 54 where the pressing roller 3 protrudes is provided on the cover plate 52. The cover 50 has a slot 55 that exposes the light-receiving portion Sb of the transparent sensor S to the conveyance passage for the continuous label body LA while the opening/closing member 20 is closed. The slot 55 is formed in a long hole shape across a movable range of the light-receiving portion Sb moved by the positioning mechanism 40. The light-receiving portion Sb receives light from the light-emitting portion Sa through the slot 55.

The cover 50 is detachably installed in the main body 21. Specifically, a latching protrusion 56 is provided on one side edge of the width direction of the cover plate 52 of the cover 50, and a latching recess 57 is provided on the side wall plate 24 of one end of the width direction of the main body 21 and is detachably engageable with the latching protrusion 56 of the cover 50. In addition, a nut plate 58 is provided on the other side edge of the width direction of the cover plate 52 of the cover 50 such that it faces a part of the rear surface of the other end side of the width direction of the base plate 23 of the main body 21 while the latching protrusion 56 is engaged with the latching recess 57. In addition, a fixing portion 60 is provided to releasably fix the nut plate 58 to the main body 21. The nut plate 58 is formed integrally with the cover plate 52 by bending an elevating piece 59.

Figure 5:
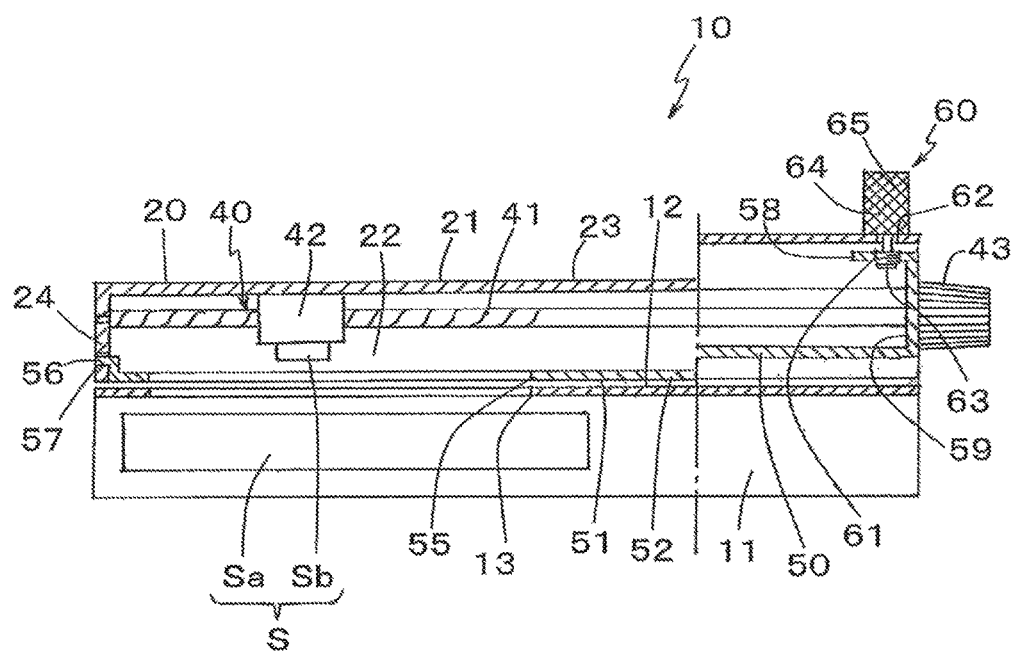
FIG. 5 is a cross-sectional front view illustrating the label position detector of the label feeding machine according to an embodiment of the invention.

As illustrated in FIGS. 3 and 5, the fixing portion 60 includes a female thread 61 formed in the nut plate 58, an installation hole 62 provided on the base plate 23 of the main body 21 to match the female thread 61, a male thread portion 63 inserted into the installation hole 62 and screwed to the female thread 61, and a bolt 65 linked to the male thread portion 63 and provided with a head 64 for manually rotating the male thread portion 63. The installation hole 62 has a diameter smaller than the maximum diameter of the male thread portion 63. A base end portion of the male thread portion 63 adjoining the head 64 is inserted into the installation hole 62, and the base end portion has a diameter smaller than the maximum diameter of the male thread portion 63. For this reason, the bolt 65 is held not to be easily detached from the installation hole 62 and not to be removed from the main body 21 when it is unfastened. The head 64 is knurled in order to facilitate a hand grip.

A surface 51 of the cover 50 is formed of a material resistant to sticking of the adhesive agent of the label L or capable of preventing sticking. For example, the surface may be subjected to fluororesin coating or plasma coating or may be embossed through texturing or the like.

The label L is fed using the label feeding machine K according to an embodiment of the invention through the following operation.

First, the continuous label body LA is set on the machine. Specifically, the opening/closing member 20 is opened, the continuous label body LA is installed on the support member 11, and the opening/closing member 20 is closed. Since the main body 21 of the opening/closing member 20 is provided with the pressing roller 3, the pressing roller 3 can be opened or closed at the same time. Therefore, it is possible to improve manipulation convenience compared to a case where they are individually opened or closed.

The light-receiving portion Sb is shifted for positioning in a suitable place by rotating the control knob 43 of the feeding reel 40. The light-receiving portion Sb can be positioned in an optimal place depending on a dimension of the label L such as width.

Then, the label L is fed by conveying the continuous label body LA. In the course of conveyance, even when the label L tends to be curled up from the strip-shaped liner sheet D between the support member 11 and the opening/closing member 20 and attach to the opening/closing member 20, it is not easily attached because the surface 51 of the cover 50 is formed of a material resistant to sticking of the adhesive agent of the label L or capable of preventing sticking.

Nevertheless, in some cases, the label L may be curled up from the strip-shaped liner sheet D and attach to the opening/closing member 20 to generate a jam. In this case, the opening/closing member 20 may be opened. When the manipulation knob 36 of the lock mechanism 30 is pulled, the engagement pieces 32 are disengaged from the engagement holes 33, and the opening/closing member 20 is raised and opened by virtue of the biasing force of the coil spring 28, so that the conveyance passage for the continuous label body LA is opened. In this state, the jammed label L may be removed. Since the surface 51 of the cover 50 is formed of a material resistant to sticking of the adhesive agent of the label L or capable of preventing sticking, it is possible to easily remove the label L and improve workability in removal.

In some cases, the jammed label L may not be easily removed as it propagates to a deeper side of the machine. In this case, the cover 50 may be detached from the main body 21. As illustrated in FIG. 3, the male thread portion 63 of the bolt 65 is unfastened from the female thread 61 by manually rotating the head 64 of the bolt 65 in order to remove the nut plate 58 from the main body 21 and disengage the engagement protrusion 56 from the engagement recess 57. As a result, the label L attached to the cover 50 can be removed by stripping it outside the machine. Therefore, it is possible to easily remove the attached label L and improve workability in removal.

After the label L is removed, the cover 50 is installed in the main body 21 again. In this case, while the latching protrusion 56 of the cover 50 is inserted into the latching recess 57 of the main body 21 for engagement, and the nut plate 58 is made to face the main body 21, the male thread portion 63 is screwed to the female thread 61 by rotating the head 64 of the bolt 65.

Since the cover 50 can be installed or detached through simple and easy manipulation by manually rotating the bolt 65, it is possible to improve workability. Then, similar to the operation described above, the continuous label body LA is installed in the support member 11, the opening/closing member 20 is closed, and the machine is then driven to feed the label L.

Although embodiments of this invention have been described hereinbefore, the aforementioned embodiments are just a part of applications of this invention, and are not intended to limit the technical scope of this invention to specific configurations of the aforementioned embodiments.

For example, although the transparent sensor S is employed as a sensor in the aforementioned embodiments, a reflective sensor may also be employed without limiting thereto. In this case, the reflective sensor may be substituted with the light-receiving portion Sb of the opening/closing member 20.

Although the label feeding machine K according to the embodiment of the invention has a print function, the invention is not limited thereto. For example, the invention may also be applied to various types of label feeding machines K such as a machine for conveying and feeding a continuous label body LA subjected to printing on the label L, a machine for attaching labels L onto products, or the like.

This application is based on and claims priority to Japanese Patent Application Laid-open No. 2014-107670 (filed in Japan Patent Office on May 26, 2014), the entire content of which is incorporated herein by reference.

The invention claimed is:

1. A label feeding machine configured to feed labels by conveying a continuous label body along a label continuous direction, the continuous label body being obtained by temporarily attaching the labels onto a strip-shaped liner sheet at equal intervals, an adhesive agent being applied on each of the labels, the label feeding machine comprising:
   a label position detector comprising
      a sensor configured to optically detect a position of the labels in a course of conveying the continuous label body;
      a support member configured to support the strip-shaped liner sheet for the conveyed continuous label body; and
      an opening/closing member installed with the sensor and provided openably or closably against the support member such that the sensor faces a conveyance passage for the continuous label body in a closed state of the opening/closing member, and the conveyance passage for the continuous label body is opened in an opened state of the opening/closing member, wherein the opening/closing member comprises
         a main body to which the sensor is installed; and
         a cover detachably installed on the main body to form a housing space for housing the sensor in combination with the main body, wherein the cover comprises a surface that forms a gap in combination with a support surface of the support member to allow passing of the continuous label body in the closed state of the opening/closing member,
   a latching protrusion provided on one side edge of the cover;
   a latching recess provided in the main body and detachably engageable with the latching protrusion;
   a nut plate provided on another side edge of the cover and configured to face a part of the main body while the latching protrusion is engaged with the latching recess; and
   a fixing portion configured to releasably fix the nut plate to the main body.

2. The label feeding machine according to claim 1, wherein the fixing portion comprises
   a female thread formed on the nut plate, and
   a bolt provided with
      a male thread portion configured to be inserted into an installation hole of the main body and screwed to the female thread, and
      a head linked to the male thread portion and configured to manually rotate the male thread.

3. The label feeding machine according to claim 1, wherein the surface of the cover is formed of a material resistant to sticking of the adhesive agent of the label or capable of preventing sticking.

4. The label feeding machine according to claim 1, wherein the sensor comprises a transparent sensor including a light-emitting portion and a light-receiving portion configured to transmit light from the light-emitting portion to the continuous label body and to detect a gap between labels using the light-receiving portion,
   the support member is formed in a hollowed shape such that any one of the light-emitting portion and the light-receiving portion is provided inside the support member,
   a slot is configured to expose the any one of the light-emitting portion and the light-receiving portion to the conveyance passage for the continuous label body, the slot being formed on the support surface of the support member, and
   the other one of the light-emitting portion and the light-receiving portion is provided on the opening/closing member.

5. The label feeding machine according to claim 4, further comprising a positioning mechanism configured to position the light-receiving portion along a width direction of the continuous label body,
   wherein a slot of the cover of the opening/closing member is formed in a long hole shape across a movable range of the light-receiving portion moved by the positioning mechanism.

6. The label feeding machine according to claim 1, further comprising:
   a conveyance roller provided on a support member side and configured to support and convey the continuous label body; and
   a pressing roller provided on the main body of the opening/closing member and configured to be pressed to the conveyance roller while the opening/closing member is closed,
   wherein the cover has an opening from which the pressing roller protrudes.

7. A label feeding machine configured to feed labels by conveying a continuous label body along a label continuous direction, the continuous label body being obtained by temporarily attaching the labels onto a strip-shaped liner sheet at equal intervals, an adhesive agent being applied on each of the labels, the label feeding machine comprising:
   a label position detector comprising
      a sensor configured to optically detect a position of the labels in a course of conveying the continuous label body;
      a support member configured to support the strip-shaped liner sheet for the conveyed continuous label body; and
      an opening/closing member installed with the sensor and provided openably or closably against the support member such that the sensor faces a conveyance passage for the continuous label body in a closed state of the opening/closing member, and the conveyance passage for the continuous label body is opened in an opened state of the opening/closing member,
   wherein the opening/closing member comprises
      a main body to which the sensor is installed;
      a cover detachably installed on the main body to form a housing space for housing the sensor in combination with the main body, the cover having a surface that forms a gap in combination with a support surface of the support member to allow passing of the continuous label body in the closed state of the opening/closing member;

a latching protrusion on one side of the cover; and
a latching recess provided in the main body,
wherein the latching protrusion is configured to detachably engage and disengage with the latching recess.

8. The label feeding machine according to claim 7, wherein the opening/closing member comprises:
a nut plate provided on a side edge of the cover and configured to face a part of the main body while the latching protrusion is engaged with the latching recess; and
a fixing portion configured to releasably fix the nut plate to the main body,
the fixing portion comprises
a female thread formed on the nut plate, and
a bolt provided with
a male thread portion configured to be inserted into an installation hole of the main body and screwed to the female thread, and
a head linked to the male thread portion and configured to manually rotate the male thread.

9. The label feeding machine according to claim 7, wherein the surface of the cover is formed of a material resistant to sticking of the adhesive agent of the label or capable of preventing sticking.

10. The label feeding machine according to claim 7, wherein the sensor comprises a transparent sensor including a light-emitting portion and a light-receiving portion configured to transmit light from the light-emitting portion to the continuous label body and to detect a gap between labels using the light-emitting portion,
the support member is formed in a hollowed shape such that any one of the light-emitting portion and the light-receiving portion is provided inside the support member,
a slot is configured to expose the any one of the light-emitting portion and the light-receiving portion to the conveyance passage for the continuous label body, the slot being formed on the support surface of the support member, and
the other one of the light-emitting portion and the light-receiving portion is provided on the opening/closing member.

11. The label feeding machine according to claim 10, further comprising a positioning mechanism configured to position the light-receiving portion along a width direction of the continuous label body,
wherein a slot of the cover of the opening/closing member is formed in a long hole shape across a movable range of the light-receiving portion moved by the positioning mechanism.

12. The label feeding machine according to claim 7, further comprising:
a conveyance roller provided on a support member side and configured to support and convey the continuous label body; and
a pressing roller provided on the main body of the opening/closing member and configured to be pressed to the conveyance roller while the opening/closing member is closed,
wherein the cover has an opening from where the pressing roller protrudes.

13. A label feeding machine configured to feed labels by conveying a continuous label body along a label continuous direction, the continuous label body being obtained by temporarily attaching the labels onto a strip-shaped liner sheet at equal intervals, an adhesive agent being applied on each of the labels, the label feeding machine comprising:
a label position detector comprising
a sensor configured to optically detect a position of the labels in a course of conveying the continuous label body;
a support member configured to support the strip-shaped liner sheet for the conveyed continuous label body; and
an opening/closing member installed with the sensor and provided openably or closably against the support member such that the sensor faces a conveyance passage for the continuous label body in a closed state of the opening/closing member, and the conveyance passage for the continuous label body is opened in an opened state of the opening/closing member,
wherein the opening/closing member comprises
a main body to which the sensor is installed;
a cover detachably installed on the main body to form a housing space for housing the sensor in combination with the main body, the cover having a surface that forms a gap in combination with a support surface of the support member to allow passing of the continuous label body in the closed state of the opening/closing member;
a latching protrusion configured to latch to one side of the main body; and
an installation portion installed to another side of the main body,
wherein the one side of the main body is deeper within the label feeding machine than the another side.

14. The label feeding machine according to claim 13, wherein the opening/closing member comprises:
a nut plate provided on a side edge of the cover and configured to face a part of the main body while the latching protrusion is engaged with a latching recess; and
a fixing portion configured to releasably fix the nut plate to the main body,
wherein the fixing portion comprises
a female thread formed on the nut plate, and
a bolt provided with
a male thread portion configured to be inserted into an installation hole of the main body and screwed to the female thread, and
a head linked to the male thread portion and configured to manually rotate the male thread.

15. The label feeding machine according to claim 13, wherein the surface of the cover is formed of a material resistant to sticking of the adhesive agent of the label or capable of preventing sticking.

16. The label feeding machine according to claim 13, wherein the sensor comprises a transparent sensor including a light-emitting portion and a light-receiving portion configured to transmit light from the light-emitting portion to the continuous label body and to detect a gap between labels using the light-emitting portion,
the support member is formed in a hollowed shape such that any one of the light-emitting portion and the light-receiving portion is provided inside the support member,
a slot is configured to expose the any one of the light-emitting portion and the light-receiving portion to the conveyance passage for the continuous label body, the slot being formed on the support surface of the support member, and the other one of the light-emitting portion and the light-receiving portion is provided on the opening/closing member.

17. The label feeding machine according to claim 16, further comprising a positioning mechanism configured to position the light-receiving portion along a width direction of the continuous label body,
   wherein a slot of the cover of the opening/closing member is formed in a long hole shape across a movable range of the light-receiving portion moved by the positioning mechanism.

18. The label feeding machine according to claim 13, further comprising:
   a conveyance roller provided on a support member side and configured to support and convey the continuous label body; and
   a pressing roller provided on the main body of the opening/closing member and configured to be pressed to the conveyance roller while the opening/closing member is closed,
   wherein the cover has an opening from where the pressing roller protrudes.

\* \* \* \* \*